US006965722B1

(12) United States Patent
Nguyen

(10) Patent No.: US 6,965,722 B1
(45) Date of Patent: Nov. 15, 2005

(54) HIGH EFFICIENCY ACTIVE MATCHING ELECTRO-OPTIC TRANSDUCER DRIVER CIRCUIT OPERABLE WITH LOW SUPPLY VOLTAGES

(75) Inventor: The' Linh Nguyen, San Jose, CA (US)

(73) Assignee: Finisar Corporation, Sunnyvale, CA (US)

( * ) Notice: Subject to any disclaimer, the term of this patent is extended or adjusted under 35 U.S.C. 154(b) by 0 days.

(21) Appl. No.: 11/075,212

(22) Filed: Mar. 8, 2005

Related U.S. Application Data

(60) Provisional application No. 60/623,357, filed on Oct. 29, 2004.

(51) Int. Cl.[7] .......................... G02B 6/00; G02B 10/12; H04B 10/04
(52) U.S. Cl. .......................... 385/147; 372/26; 372/32; 372/38.07; 330/295; 330/311
(58) Field of Search .............................. 385/14, 24, 37, 385/39, 129, 147; 324/95; 372/26, 32, 38, 372/38.02; 330/295, 286, 311, 124 R, 54; 60/275; 422/186.28; 607/5, 7, 16, 37; 388/811, 388/910; 332/102

(56) References Cited

U.S. PATENT DOCUMENTS 5,626,619 A * 5/1997 Jacobson et al. ............... 607/5
5,845,488 A * 12/1998 Hancock et al. ............... 60/275
6,007,682 A * 12/1999 Hancock et al. ............ 204/164
6,618,406 B1 * 9/2003 Kaminishi ............... 372/38.02
6,711,190 B2 * 3/2004 Schemmann et al. .... 372/38.02
6,794,934 B2 * 9/2004 Betti-Berutto et al. .. 330/124 R
6,864,750 B2 * 3/2005 Shigematsu ................. 330/311
2003/0002550 A1 * 1/2003 Schemmann et al. .... 372/38.02
2003/0011436 A1 * 1/2003 Shigematsu ................. 330/311
2003/0112075 A1 * 6/2003 Betti-Berutto et al. ...... 330/295
2004/0208207 A1 * 10/2004 Kasper et al. ................ 372/26
2005/0105574 A1 * 5/2005 Wu et al. ................. 372/38.07

* cited by examiner

Primary Examiner—Akm Enayet Ullah
(74) Attorney, Agent, or Firm—Workman Nydegger

(57) ABSTRACT

An optical transmitter and/or a constituent electro-optic transducer driver that performs active matching. The transducer driver performs active matching using a voltage step down through one base-emitter bipolar transistor, followed by a step up approach through the base-emitter of another bipolar transistor, thereby allowing for lower supply voltages. Furthermore, the voltage drop across the source resistor is minimal by using an operation amplifier in a feedback configuration, thereby further encouraging operability with low supply voltages. The electro-optic transducer driver is also beneficial in that it has high AC-coupling efficiency of the modulation current to the electro-optic transducer, may operate at high speeds with reduced jitter.

24 Claims, 3 Drawing Sheets

HIGH EFFICIENCY ACTIVE MATCHING ELECTRO-OPTIC TRANSDUCER DRIVER CIRCUIT OPERABLE WITH LOW SUPPLY VOLTAGES

CROSS-REFERENCE TO RELATED APPLICATIONS

This application claims the benefit of U.S. Provisional Application No. 60/623,357, filed Oct. 29, 2004, which is incorporated herein by reference in its entirety.

BACKGROUND OF THE INVENTION

1. The Field of the Invention

The present invention relates generally to optical transmitters. More specifically, the present invention relates to active matching electro-optic transducer driver circuits that have high efficiency and are operable with low supply voltages.

2. Background and Relevant Art

Computing and networking technology have transformed our world. As the amount of information communicated over networks has increased, high speed transmission has become ever more critical. Many high speed data transmission networks rely on optical transceivers and similar devices for facilitating transmission and reception of digital data embodied in the form of optical signals over optical fibers. Optical networks are thus found in a wide variety of high speed applications ranging from as modest as a small Local Area Network (LAN) to as grandiose as the backbone of the Internet.

Typically, data transmission in such networks is implemented by way of an optical transmitter (also referred to as an electro-optic transducer), such as a laser or Light Emitting Diode (LED). The electro-optic transducer emits light when current is passed through it, the intensity of the emitted light being a function of the current magnitude. An electro-optic transducer driver generates the appropriate magnitude of current to pass through the electro-optic transducer to generate the appropriate amount of optical intensities corresponding to the data being transmitted.

In order to assert one binary value, a relatively low current (called herein "$I_{BIAS}$") is passed through the electro-optic transducer to thereby cause a relatively low optical power level to be transmitted onto the optical fiber. In order to assert the opposite binary value, a relatively high current is passed through the electro-optic transducer to thereby cause a relatively high optical power level (e.g., $I_{BIAS}$ plus a maximum modulation current called herein "$I_{MOD}$") to be transmitted onto the optical fiber. Accordingly, by superimposing a modulation current (that varies between zero and $I_{MOD}$) upon the bias current, an appropriate sequence of bits may be transmitted.

FIG. 2 illustrates a driver-transducer circuit 200 that includes an electro-optic transducer 201 in the form of a specially manufactured diode. Methods for fabricating electro-optic transducer 201 in the form of a diode are well known in the art. The optical power transmitted by the electro-optic transducer 201 is approximately proportional to the amount of current passed through the electro-optic transducer 201 for the frequency range of interest.

The remaining circuitry 210 shown in FIG. 2 other than the electro-optic transducer 201 is an electro-optic transducer driver. The electro-optic transducer driver 210 applies the appropriate current through the electro-optic transducer 201 depending on the data. In the illustrated embodiment, the electro-optic transducer 210 is what is referred to as "DC-coupled" to the electro-optic transducer 201.

Specifically, a bias current source 211 draws a bias current $I_{BIAS}$ through the electro-optic transducer 201. In addition, a modulation current source 212 draws the maximum modulation current $I_{MOD}$ through either the bipolar transistor 221, or the bipolar transistor 222, or through both of the bipolar transistors 221 and 222 in a split manner. The amount of modulation current $I_{MOD}$ drawn through the electro-optical transducer 201 depends on the differential data signals DATA and DATA! applied at the base terminal of the corresponding bipolar transistors 221 and 222.

The DC-coupled circuitry 200 of FIG. 2 is advantageous in that the modulation current is drawn completely through the electro-optic transducer 201 through the bi-polar transistor 222. Accordingly, the circuit 200 is highly efficient. Furthermore, the DC-coupled circuit 200 may operate on a relatively low supply voltage of, for example, 3.3 volts. However, in high-frequency applications, the electro-optic transducer 201 is required to be physically close to the electro-optic transducer driver 210. Thus, heat generated by the electro-optic transducer driver 210 may be easily transferred to the electro-optic transducer 201. Some electro-optic transducers, such as lasers, are particularly sensitive to temperature in that the efficiency at which they convert electricity to light is highly temperature dependent. Furthermore, the speed of the laser is degraded as the temperature increases. Thus, either a lower level of performance must be expected of this configuration, or great expense is taken to provide an effective way of dissipating heat from the electro-optic transducer 201 despite the close proximity to the electro-optic transducer driver 210 that acts as a heat source.

FIG. 3 illustrates another conventional driver-transducer circuit 300. In this circuit, the modulation current of the electro-optic transducer driver 310 is "AC-coupled" to the electro-optic transducer 301. A bias current source 311 supplies the bias current $I_{BIAS}$ plus $I_{MOD}/2$ through the electro-optic transducer 301. A modulation current source 312 causes modulation current to pass through the electro-optic transducer 301 through AC-coupling capacitors 325A and 325B.

Specifically, the modulation current source draws 1/n times (where "n" is the AC coupling coefficient) the maximal modulation current $I_{MOD}$ in a split manner through the bipolar transistors 321 and 322. The amount of current drawn through resistor 323 and through bipolar transistor 321 depends on data signal DATA and DATA!. Accordingly, the amount of current drawn through source resistor 324 (having resistance $R_S$) and bipolar transistor 322 depends on data signal DATA and DATA! as well, since the sum of current drawn through both bipolar transistors 321 and 322 remains constant at $I_{MOD}/n$.

The amount of current drawn through bipolar transistor 322 may thus vary from zero to $I_{MOD}/n$, depending on the data signal DATA. Conversely, the current drawn through bipolar transistor 321 may vary from zero to $I_{MOD}/n$ as well, in a complementary manner to the current drawn through bipolar transistor 322. The resulting differential current is AC-coupled through capacitors 325A and 325B, through corresponding transmission lines 326A and 327B, and through corresponding load resistors 327A and 327B (each having resistance $R_L$) so that only the fraction equal to the AC-coupling coefficient "n" of the differential current passing through bipolar transistors 322 and 321 is provided through the electro-optic transducer 301. Therefore, the modulation current provided through the electro-optic transducer 301 varies from zero to $I_{MOD}$, depending on the data signal DATA.

The AC-coupled driver-transducer circuit 300 of FIG. 3 is advantageous in that the electro-optic transducer 301 may be located at some distance from the electro-optic transducer driver 310. Accordingly, heat generated by the electro-optic transducer driver 310 is not transferred as much to the electro-optic transducer 301. Furthermore, heat control units such as Thermo Electric Coolers (TECS) may more easily be affixed in effective proximity to the transducer without competing as much for space with the electro-optic transducer driver 310. Thus, the AC-coupled driver-transducer circuit 300 of FIG. 3 permits for more efficient and cost-effective control of temperature.

However, the AC-coupled driver-transducer circuit 300 does have a significant disadvantage. The driver circuit 310 in the AC-coupled driver-transducer circuit 300 must draw more modulation current than the driver circuit 210 in the DC-coupled driver-transducer circuit 200 of FIG. 2. For instance, the modulation current drawn by driver circuit 310 is $I_{MOD}/n$, where "n" (the coupling coefficient) is less than one, and is ideally around 50% for optimal performance. Accordingly, the power dissipation of the driver circuit 310 in the AC-coupled configuration is higher than that in the DC-coupled configuration. This increased power usage increases the cost of operating the driver circuit, and also results in the driver circuit generating more heat. Heat may have an adverse impact on the performance of the driver circuit, and may result in reducing the operable lifetime of the driver circuit.

As an additional disadvantage, the presence of the source resistors 323 and 324 in the path between voltage sources means that the driver circuit 310 might operate using higher supply voltages. The driver circuit 210 of the DC-coupled configuration may operate at 3.3 volts, whereas the driver circuit 310 of the AC-coupled configuration may use supply voltages of 5 volts. The industry trend is to reduce the power dissipation either by reducing the required voltage supply and/or reducing current consumption in order to increase the density of optical transceivers that can be installed in a given space such as, for example, a switch box.

FIG. 4 illustrates a conventional active matching driver-transducer circuit 400. In this circuit 400, the driver 410 is differentially AC coupled to the transducer 401 through the capacitors 425A and 425B, the transmission lines 426A and 426B, and the load resistors 427A and 427B. Active matching makes it possible to deliver close to 100% of $I_{MOD}$ to the load $R_L$ and transducer 401, thereby improving the power efficiency of the circuit while maintaining good source-load matching and high-frequency performance. Unfortunately, in order to get a high bandwidth between the driver 410 and the transducer 401, the source and load resistors should have a sufficiently high resistance. Such resistances may typically be between twenty and fifty ohms. Accordingly, the way the transistors and resistors are stacked between the high and low voltage supplies, a relatively high voltage supply difference of 5 volts is typically used for this configuration.

Accordingly, what would be advantageous is an active matching driver-transducer circuit that has high AC coupling efficiency, and that may operate at a lower supply voltage.

BRIEF SUMMARY OF THE INVENTION

The foregoing problems with the prior state of the art are overcome by the principles of the present invention, which relate to an optical transmitter and/or a constituent electro-optic transducer driver that performs active matching, with high AC coupling efficiency, and that is operable at high speeds and with low supply voltages. The transducer driver performs active matching using a voltage step down through the base-emitter region of an emitter-follower bipolar transistor, followed by a voltage step up through the base-emitter region of a diode-connected bipolar transistor, thereby allowing for lower supply voltages. Furthermore, the voltage drop across the source matching resistor is substantially nulled by using an operational amplifier in a feedback configuration to set the DC point at the collector terminal of the diode-connected bi-polar transistor, thereby further facilitating operability with low voltage supply. The electro-optic transducer driver is also beneficial in that it has high AC-coupling efficiency of the modulation current to the electro-optic transducer, and has good impedance matching. Therefore, the electro-optic transducer driver may operate at high speeds with low jitter.

The active matching electro-optic transducer driver circuit has a differential data input terminal for receiving differential data to be transmitted as an optic signal. For example, if the electro-optic transducer driver circuit is part of an optical transceiver coupled to a host computing system, the data may be provided by the host computing system. During operation, the differential data input terminal carries the data to be asserted on the electro-optic transducer coupled to the driver.

A first data input differential bipolar transistor pair (also called herein a "first data input differential bipolar pair") has their base terminals coupled to the differential data input terminals. A first set of resistors are coupled between a high voltage rail and the collector terminals of the first data input differential bipolar pair. A second set of bipolar transistors (also called herein "step down bipolar transistors") has their base terminals coupled to the lower voltage terminals of the first set of resistors, and collector terminals coupled to the high voltage rail. The first data input differential bipolar pair may be operating in the linear region, having current being drawn from their emitter terminals.

A second set of resistors (also called herein "source resistors") has their first terminals coupled to the emitter terminals of the step down bipolar transistors. A third set of bipolar transistors (also called herein "step up bipolar transistors") are diode-connected with their collector terminals coupled to their base terminals. The collector terminals of the step up bipolar transistors are AC-coupled to the electro-optic transducer. The emitter terminals of the step up bipolar transistors are coupled to the second terminals of the source resistors.

A p-type metal-oxide semiconductor field effect transistor (MOSFET) has a source terminal directly coupled to the high voltage rail, and a drain terminal coupled to a first terminal of an inductor or series of inductors whose overall inductance values and frequency characteristics are chosen or designed such that it covers the frequency band of interest. The other terminal of the inductor is connected to the collector terminals of the step up bipolar transistors.

A fourth set of bipolar transistors (also called herein a "second data input differential bipolar pair") have their collector terminals coupled to the collector terminals of the step up bipolar transistors, and have base terminals coupled to the differential data input terminals. A modulation current source is coupled to the emitter terminals of the second data input differential bipolar pair so as to draw current from the emitter terminals of the second data input differential bipolar pairs.

An operational amplifier has the positive input terminal coupled to the emitter terminals of the step up bipolar transistors through a high-value resistors having a high resistance. Conversely, the negative input terminal of the operational amplifier is coupled to the emitter terminals of the step down bipolar transistors through a high value resistor having the same high resistance. The output terminal of the operational amplifier is coupled to the gate terminal of the p-type MOSFET. This feedback configuration forces the voltage drop across the source resistors to effectively zero.

Current may be drawn from the emitter terminals of both of the step down bipolar transistors and both of the step up bipolar transistors to ensure high-speed performance of the bipolar transistors.

Additional features and advantages of the invention will be set forth in the description that follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The principles of the present invention relate to an optical transmitter and/or a constituent electro-optic transducer driver that performs active matching, with high AC coupling efficiency, and that is operable at high speeds and with low supply voltages.

Figure 1:
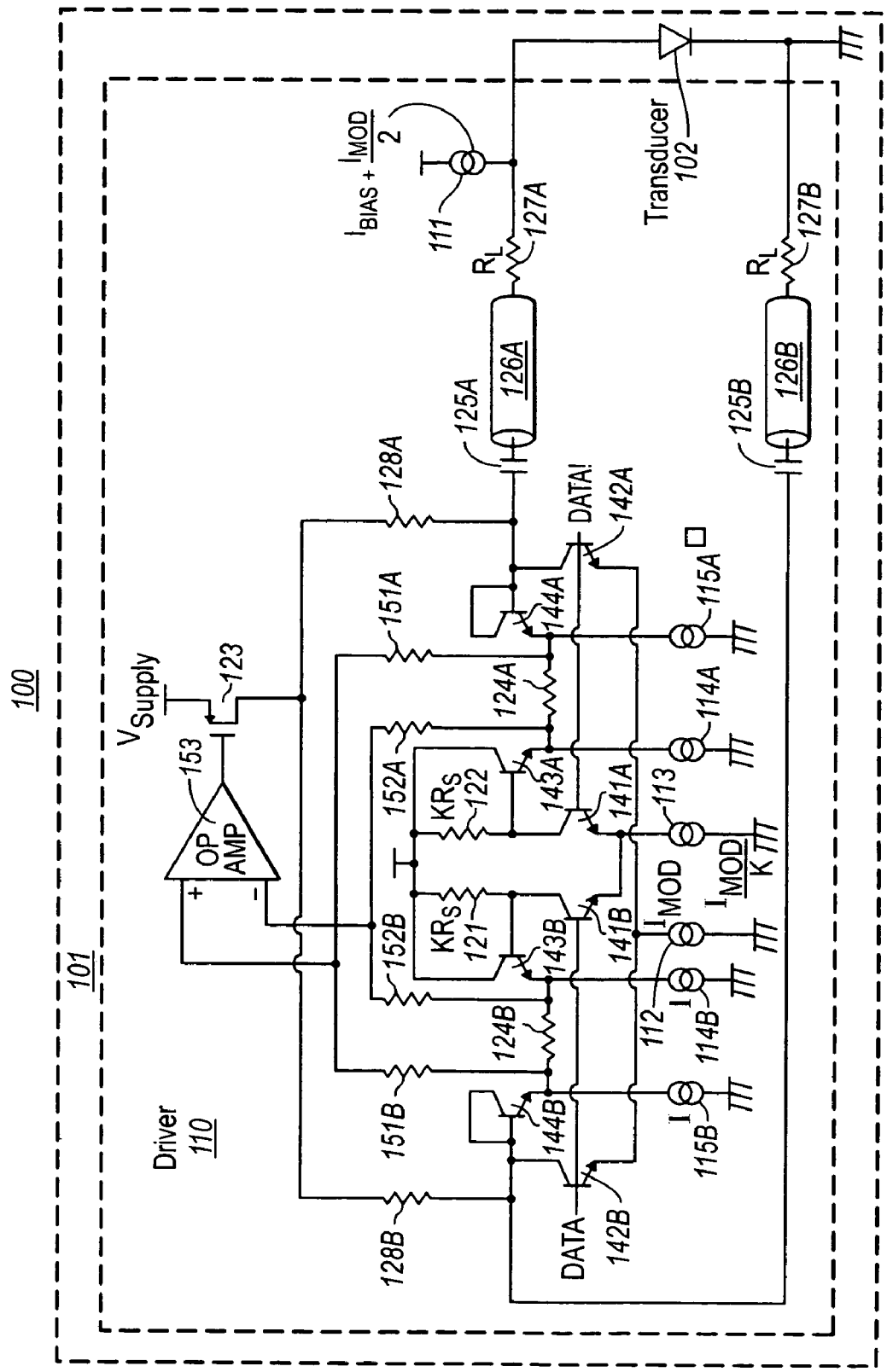
FIG. 1 schematically illustrates an optical transmitter that includes an active match electro-optic transducer driver circuit in accordance with the principles of the present invention.
Figure 2:
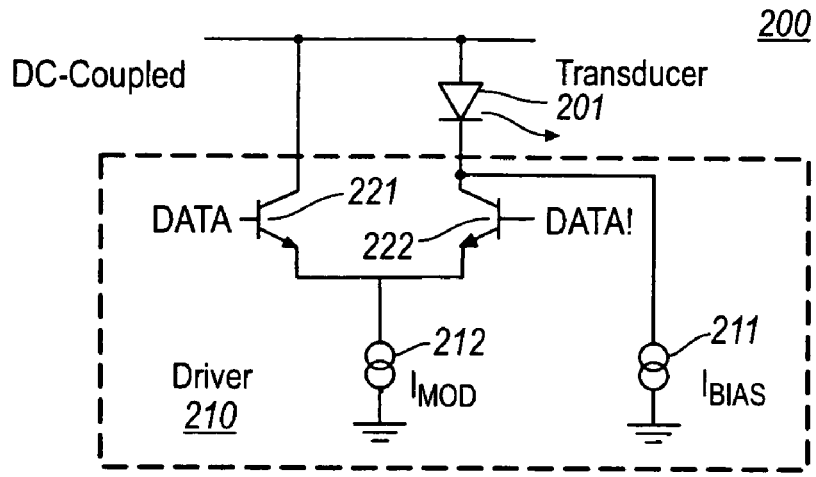
FIG. 2 is a circuit diagram of a conventional driver-transducer circuit in which the electro-optic transducer driver is DC-coupled to the electro-optic transducer.
Figure 3:
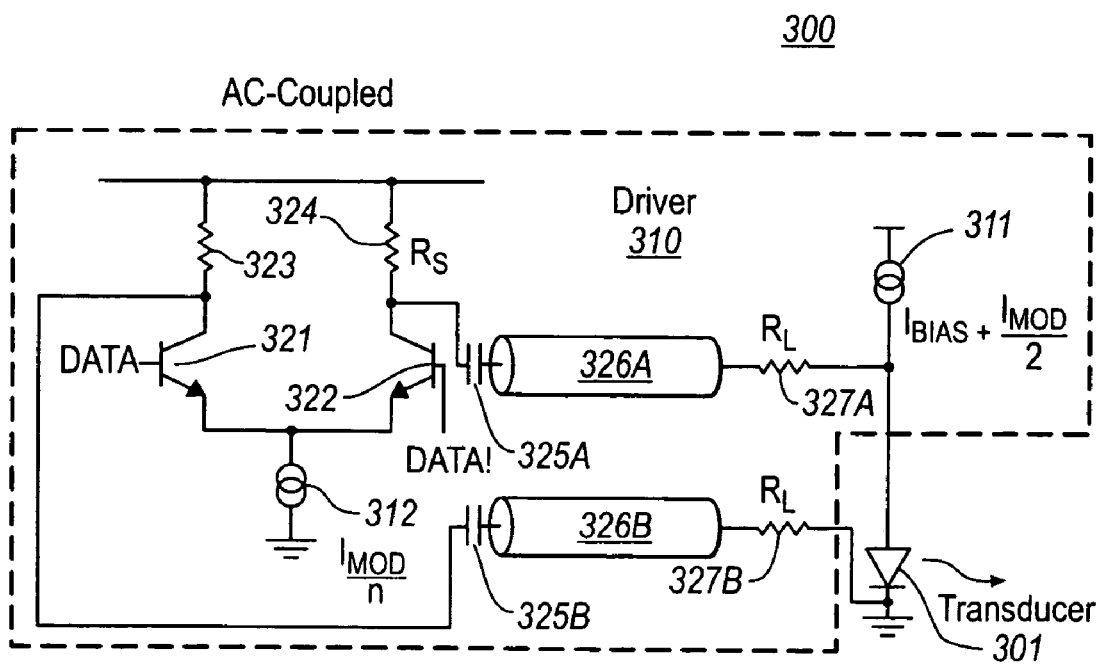
FIG. 3 is a circuit diagram of a conventional driver-transducer circuit in which the electro-optic transducer driver is AC-coupled to the electro-optic transducer.

FIG. 1 illustrates an optical transmitter 100 in accordance with the principles of the present invention. While the optical transmitter 100 will be described in some detail, the optical transmitter 100 is described by way of illustration only, and not by way of restricting the scope of the invention. The principles of the present invention are suitable for 1G, 2G, 4G, 10G and higher bandwidth fiber channels as sensitivity to operational circumstances increases. Furthermore, the principles of the present invention may be implemented in laser transmitter/receivers of any form factor such as XFP, SFP and SFF, without restriction. The principles of the present invention may also be applied to an optical transmitter in any environment, even in an environment that includes an optical receiver. Accordingly, the principles of the present invention may be implemented in an optical transceiver environment.

The optical transmitter 100 includes a driver-transducer circuit 101 that forms part of the transmit path. The driver transducer circuit 101 includes an electro-optic transducer 102 such as a laser or Light Emitting Diode (LED). The current that passes through the electro-optic transducer 102 is generated by electro-optic transducer driver 110 (also referred to herein as "driver 110" or "transducer driver 110").

Figure 4:
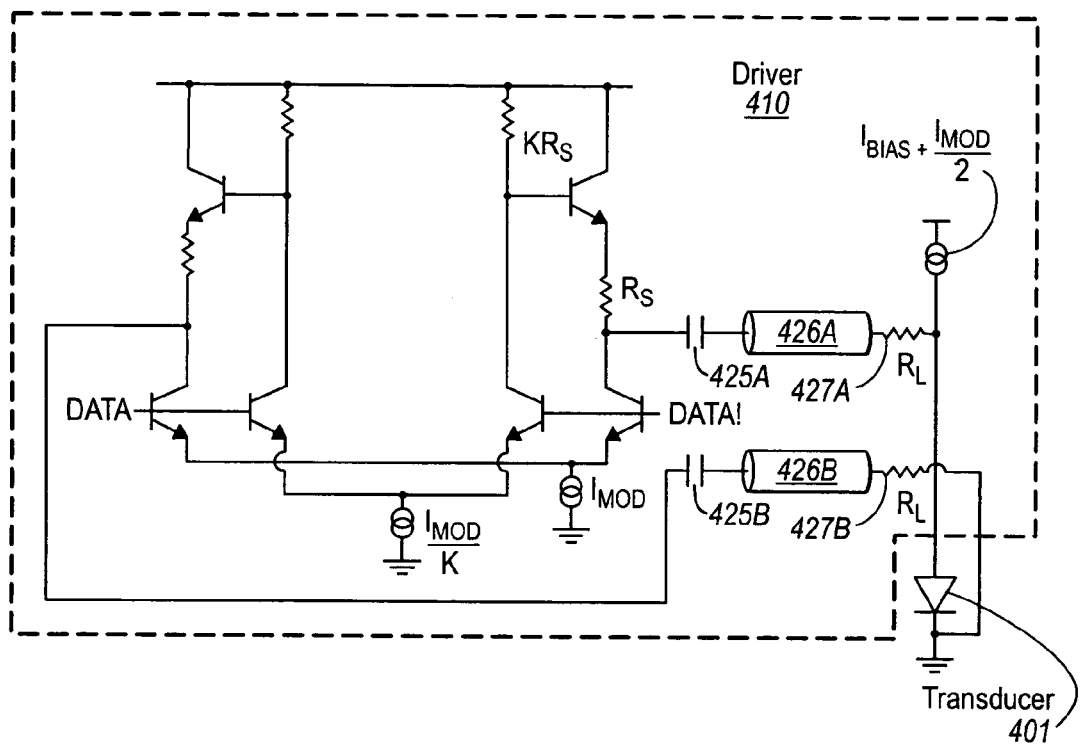
FIG. 4 is a circuit diagram of a conventional driver-transducer circuit that performs active matching.

The transducer driver 110 performs active matching thereby reducing jitter even at high data rates. However, in contrast to the conventional active matching electro-optic transducer driver 410 of FIG. 4, the transducer driver 110 of FIG. 1 performs active matching using a voltage step down through the base-emitter region of an emitter-follower bipolar transistor, followed by a voltage step up through the base-emitter region of a diode-connected bipolar transistor. This reduces the voltage requirement for the driver 110 thereby allowing the driver 110 to operate at low supply voltages such as, for example, 3.3 Volts.

The driver 110 includes a DC current source 111 that generates a current equal to the bias current $I_{BIAS}$ plus $I_{MOD}/2$. To generate the AC component of the current, the driver 110 has a differential data input terminal for receiving differential data (illustrated as signals DATA and DATA!) to be transmitted as an optical signal. For example, if the electro-optic transducer driver circuit is part of an optical transceiver coupled to a host computing system, the data may be provided by the host computing system. During operation, the data input terminal carries the data to be asserted on the electro-optic transducer coupled to the driver. Although FIG. 1 is described as a differential signal driver, the principles of the present invention may be applied to non-differential signal drivers as well.

A first data input differential bipolar transistor pair 141A and 141B has their base terminals coupled to the differential data input terminals. For instance, transistor 141B has its base terminal coupled to data signal DATA, while transistor 141A has its base terminal coupled to complementary data signal DATA!. A first set of resistors 121 and 122 are coupled between a high voltage rail (e.g., $V_{SUPPLY}$) and the collector terminals of the first data input bipolar transistor pairs 141A and 141B. For instance, resistor 121 is coupled between the high voltage rail and the collector terminal of the transistor 141B, while the resistor 122 is coupled between the high voltage rail and the collector terminal of the transistor 141A. Both resistors 121 and 122 have resistance value of K times the value of the load system's characteristic impedance, namely the impedance of transmission lines 126A and 126B, and K is greater than 1 and usually greater than 5 to make the implementation sufficiently power efficient to merit its use. The modulation current $I_{MOD}/K$, where "K" is the same scaling factor used in determining the value of resistors 121 and 122 as described in the above sentence, is drawn from the emitter terminals of the first data input bipolar transistors 141A and 141B using current source 113. A second set of bipolar transistors 143A and 143B (also called herein a "step down bipolar transistor") has their base terminals coupled to the lower voltage terminals of the first set of resistors 121 and 122, and collector terminals coupled to the high voltage rail. For instance, transistor 143A is its base terminal connected to the lower terminal of resistor 122 and its collector terminal coupled to the high voltage rail, while the transistor 143B has its base terminal connected to the lower terminal of the resistor 121 with its collector terminal coupled to the high voltage rail. The first data input differential bipolar pair 141A and 141B may be operating in the linear region, having current being drawn from their emitter terminals.

A second set of resistor 124A and 124B (also called herein a "source resistors 124") have a source resistance $R_S$ and has their first terminals coupled to the emitter terminals of the step down bipolar transistors 143A and 143B. For instance, resistor 124A is connected to the emitter terminal of the transistor 143A, and the resistor 124B is connected to the emitter terminal of the transistor 143B. A third set of bipolar transistors 144A and 144B (also called herein a "step up bipolar transistors 144") are diode-connected with their collector terminals coupled to their base terminals. The collector terminals of the step up bipolar transistors 144 are AC-coupled to the electro-optic transducer 102. For instance, the collector terminal of bipolar transistor 144A is AC coupled to the anode terminal of the transducer 102 through capacitor 125A, transmission channel 126A, and load resistor 127A. The collector terminal of bipolar transistor 144B is AC coupled to the cathode terminal of the transducer 102 through capacitor 125B, transmission channel 126B, and load resistor 127B. The emitter terminals of the step up bipolar transistors 144 are coupled to the second terminals of the source resistors 124. Specifically, the emitter terminal of the step up bipolar transistor 144A is connected to the resistor 124A, and the emitter terminal of the step up bipolar transistor 144B is connected to the resistor 124B.

In order to further reduce the voltage drop across the source resistor, and thereby reduce the voltage requirements of the circuit as a whole, an operational amplifier 153 is used in a feedback configuration. Specifically, a p-type field effect transistor 123 (e.g., a Metal Oxide Semiconductor FET (MOSFET)) has a source terminal at least indirectly coupled to the high voltage rail, and a drain terminal at least indirectly coupled to the collector terminal of the step up bipolar transistors 144. Inductors 128A and 128B may be placed (as in the illustrated case of FIG. 1) between the drain terminal of the p-type field effect transistor 123 and the collector terminals of the step up bipolar transistors 144A and 144B. The inductors 128A and 128B may each represent a single inductor and or a combination (e.g., a series) of inductors whose overall inductance values and frequency characteristics are chosen or designed such that it covers the frequency band of interest.

A fourth set of bipolar transistors 142A and 142B (also called herein a "second data input bipolar transistor 142") have their collector terminals coupled to the collector terminals of the step up bipolar transistors 144, and have base terminals coupled to the data input terminal. For instance, transistor 142B has a base terminal receiving data signal DATA and has a collector terminal connected to the collector terminals of the bipolar transistors 144B. Also, transistor 142A has a base terminal receiving complementary data signal DATA! and has a collector terminal connected to the collector terminal of the bipolar transistor 144A. Modulation current source 112 (supplying current $I_{MOD}$) is coupled to the emitter terminals of each of the second data input bipolar transistors 145A and 145B, so as to draw current from the emitter terminals of the second data input bipolar transistor 145A and 145B.

The operational amplifier 153 has the positive input terminal coupled to the emitter terminal of the step up bipolar transistor 144A through a high-value resistor 151A, and coupled to the emitter terminal of the step up bipolar transistor 144B through a high-value resistor 151B having the same resistance. Conversely, the negative input terminal of the operational amplifier 153 is coupled to the emitter terminal of the step down bipolar transistor 143A through another high value resistor 152A having the same resistance, and is coupled to the emitter terminal of the step down bipolar transistor 143B through high value resistor 152B having the same resistance. The output terminal of the operational amplifier 153 is coupled to the gate terminal of the p-type MOSFET 123. This feedback configuration forces the voltage drop across the source resistors 124A and 124B to effectively zero. Since the voltage drop across the resistors 124 is minimal, the minimal required voltage supply is further lowered.

Current may be drawn from the emitter terminals of the step down transistors 143 and the step up bipolar transistors 144 to ensure high-speed performance of the bipolar transistors 143 and 144 (see current sources 114A, 114B, 115A and 115B).

As previously mentioned, this structure permits for active matching of the driver and transducer impedances, thereby reducing jitter and permitting higher data rates. Furthermore, operation is possible using relative low supply voltages. Also, most, if not substantially all of the modulation current $I_{MOD}$ is AC coupled to the transducer 102. This is accomplished for several reasons. First, the voltage applied at the collector terminals of the step up bipolar transistors 144 tends to offset the voltage applied at the collector terminals of the second data input bipolar transistors 145. Accordingly, the path leading from the collector terminals of the second data input bipolar transistors 145 to the high voltage rail tends to be high impedance. This high impedance is further supported by the broadband inductors 128 whose impedances, when added to the drain impedance of the p-type transistor 123 tends to result in high impedance across the relevant frequency bands. The high AC-coupling allows for a highly efficient electro-optic transducer driver 110.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes, which come within the meaning and range of equivalency of the claims, are to be embraced within their scope.

What is claimed and desired secured by United States Letters Patent is:

1. An active matching electro-optic transducer driver circuit comprising the following:
    a data input terminal configured to carry data to be asserted on an electro-optic transducer coupled to the electro-optic transducer driver;
    a first bipolar transistor having a base terminal coupled to the data input terminal;
    a high voltage rail configured to carry a supply voltage during operation;
    a first resistor having a first terminal coupled to the high voltage rail, and a second terminal coupled to a collector terminal of the first bipolar transistor;
    a second bipolar transistor having a base terminal coupled to the second terminal of the first resistor, and a collector terminal coupled to the high voltage rail;

a second resistor having a first terminal coupled to an emitter terminal of the second bipolar transistor;

a third bipolar transistor having a collector terminal that is coupled to a base terminal of the third bipolar transistor and being configured to be AC coupled to the electro-optic transducer, the third bipolar transistor further having an emitter terminal coupled to a second terminal of the second resistor;

a field effect transistor having a source terminal at least indirectly coupled to the high voltage rail, and a drain terminal at least indirectly coupled to the collector terminal of the third bipolar transistor;

a fourth bipolar transistor having a collector terminal coupled to the collector terminal of the third bipolar transistor, and having a base terminal coupled to the data input terminal;

a modulation current source coupled to an emitter terminal of the fourth bipolar transistor so as to draw current from the emitter terminal of the fourth bipolar transistor; and an operational amplifier having a first input terminal coupled to the first terminal of the second resistor, having a second input terminal coupled to the second terminal of the second resistor, and having an output terminal coupled to a gate terminal of the field effect transistor.

2. An active matching electro-optic transducer driver circuit in accordance with claim 1, further comprising:

an inductor, wherein the drain terminal of the field effect transistor is indirectly coupled to the collector terminal of the fourth bipolar transistor through the inductor.

3. An active matching electro-optic transducer driver circuit in accordance with claim 1, further comprising:

an inductor, wherein the drain terminal of the field effect transistor is indirectly coupled to the high voltage rail through the inductor.

4. An active matching electro-optic transducer driver circuit in accordance with claim 1, further comprising:

a second current source configured to draw a current from an emitter terminal of the second bipolar transistor; and a third current source configured to draw a current from an emitter terminal of the third bipolar transistor.

5. An active matching electro-optic transducer driver circuit in accordance with claim 1, wherein the electro-optic transducer driver is a laser driver.

6. An active matching electro-optic transducer driver circuit in accordance with claim 1, wherein the electro-optic transducer is part of a transmit path of an optical transmitter.

7. An active matching electro-optic transducer driver circuit in accordance with claim 6, wherein the optical transmitter is a 1G laser transmitter.

8. An active matching electro-optic transducer driver circuit in accordance with claim 6, wherein the optical transmitter is a 2G laser transmitter.

9. An active matching electro-optic transducer driver circuit in accordance with claim 6, wherein the optical transmitter is a 4G laser transmitter.

10. An active matching electro-optic transducer driver circuit in accordance with claim 6, wherein the optical transmitter is a 10G laser transmitter.

11. An active matching electro-optic transducer driver circuit in accordance with claim 6, wherein the optical transmitter is a 40G laser transmitter.

12. An active matching electro-optic transducer driver circuit in accordance with claim 1, wherein the active matching electro-optic transducer driver is a differential driver, the data input terminal being a first data input terminal, the active matching electro-optic transducer driver circuit further comprising:

a second data input terminal configured to carry data that is complementary to the data asserted on the first data input terminal;

a fifth bipolar transistor having a base terminal coupled to the second data input terminal;

a third resistor having a first terminal coupled to the high voltage rail, and a second terminal coupled to a collector terminal of the fifth bipolar transistor;

a sixth bipolar transistor having a base terminal coupled to the second terminal of the third resistor, and a collector terminal coupled to the high voltage rail;

a fourth resistor having a first terminal coupled to an emitter terminal of the sixth bipolar transistor;

a seventh bipolar transistor having a collector terminal that is coupled to a base terminal of the seventh bipolar transistor and being configured to be AC coupled to the electro-optic transducer, the seventh bipolar transistor further having an emitter terminal coupled to a second terminal of the fourth resistor;

an eighth bipolar transistor having a collector terminal coupled to the collector terminal of the seventh bipolar transistor, and having a base terminal coupled to the second data input terminal; and a second modulation current source coupled to an emitter terminal of the eighth bipolar transistor so as to draw current from the emitter terminal of the eighth bipolar transistor.

13. An optical transmitter comprising the following:

an active matching electro-optic transducer driver circuit; and an electro-optic transducer, wherein the active matching electro-optic transducer driver circuit comprising the following:

a data input terminal configured to carry data to be asserted on an electro-optic transducer coupled to the electro-optic transducer driver;

a first bipolar transistor having a base terminal coupled to the data input terminal;

a high voltage rail configured to carry a supply voltage during operation;

a first resistor having a first terminal coupled to the high voltage rail, and a second terminal coupled to a collector terminal of the first bipolar transistor;

a second bipolar transistor having a base terminal coupled to the second terminal of the first resistor, and a collector terminal coupled to the high voltage rail;

a second resistor having a first terminal coupled to an emitter terminal of the second bipolar transistor;

a third bipolar transistor having a collector terminal that is coupled to a base terminal of the third bipolar transistor and being configured to be AC coupled to the electro-optic transducer, the third bipolar transistor further having an emitter terminal coupled to a second terminal of the second resistor;

a field effect transistor having a source terminal at least indirectly coupled to the high voltage rail, and a drain terminal at least indirectly coupled to the collector terminal of the third bipolar transistor;

a fourth bipolar transistor having a collector terminal coupled to the collector terminal of the third bipolar transistor, and having a base terminal coupled to the data input terminal;

a modulation current source coupled to an emitter terminal of the fourth bipolar transistor so as to draw current from the emitter terminal of the fourth bipolar transistor; and an operational amplifier having a first input terminal coupled to the first terminal of the second resistor, having a second input terminal coupled to the second terminal of the second resistor, and having an output terminal coupled to a gate terminal of the field effect transistor.

14. An optical transmitter in accordance with claim 13, wherein the active matching electro-optic transducer driver circuit further comprises:

an inductor, wherein the drain terminal of the field effect transistor is indirectly coupled to the collector terminal of the fourth bipolar transistor through the inductor.

15. An optical transmitter in accordance with claim 13, wherein the active matching electro-optic transducer driver circuit further comprises:

an inductor, wherein the drain terminal of the field effect transistor is indirectly coupled to the high voltage rail through the inductor.

16. An optical transmitter in accordance with claim 13, wherein the active matching electro-optic transducer driver circuit further comprises:

a second current source configured to draw a current from an emitter terminal of the second bipolar transistor; and a third current source configured to draw a current from an emitter terminal of the third bipolar transistor.

17. An optical transmitter in accordance with claim 13, wherein the electro-optic transducer driver is a laser driver.

18. An optical transmitter in accordance with claim 13, wherein the electro-optic transducer is part of a transmit path of an optical transmitter.

19. An optical transmitter in accordance with claim 18, wherein the optical transmitter is a 1G laser transmitter.

20. An optical transmitter in accordance with claim 18, wherein the optical transmitter is a 2G laser transmitter.

21. An optical transmitter in accordance with claim 18, wherein the optical transmitter is a 4G laser transmitter.

22. An optical transmitter in accordance with claim 18, wherein the optical transmitter is a 10G laser transmitter.

23. An optical transmitter in accordance with claim 18, wherein the optical transmitter is a 40G laser transmitter.

24. An optical transmitter in accordance with claim 18, wherein the active matching electro-optic transducer driver is a differential driver, the data input terminal being a first data input terminal, the active matching electro-optic transducer driver circuit further comprising:

a second data input terminal configured to carry data that is complementary to the data asserted on the first data input terminal;

a fifth bipolar transistor having a base terminal coupled to the second data input terminal;

a third resistor having a first terminal coupled to the high voltage rail, and a second terminal coupled to a collector terminal of the fifth bipolar transistor;

a sixth bipolar transistor having a base terminal coupled to the second terminal of the third resistor, and a collector terminal coupled to the high voltage rail;

a fourth resistor having a first terminal coupled to an emitter terminal of the sixth bipolar transistor;

a seventh bipolar transistor having a collector terminal that is coupled to a base terminal of the seventh bipolar transistor and being configured to be AC coupled to the electro-optic transducer, the seventh bipolar transistor further having an emitter terminal coupled to a second terminal of the fourth resistor;

an eighth bipolar transistor having a collector terminal coupled to the collector terminal of the seventh bipolar transistor, and having a base terminal coupled to the second data input terminal; and a second modulation current source coupled to an emitter terminal of the eighth bipolar transistor so as to draw current from the emitter terminal of the eighth bipolar transistor.

\* \* \* \* \*